United States Patent
Fukumoto et al.

(10) Patent No.: US 6,520,279 B2
(45) Date of Patent: Feb. 18, 2003

(54) CURRENT-CARRYING CONTROL DEVICE AND ELECTRIC POWER STEERING APPARATUS

(75) Inventors: Tetsuya Fukumoto, Kyoto (JP); Takamoto Sawano, Kyoto (JP); Yoshiteru Higashihara, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/766,638

(22) Filed: Jan. 23, 2001

(65) Prior Publication Data

US 2001/0026134 A1 Oct. 4, 2001

(30) Foreign Application Priority Data

Jan. 25, 2000 (JP) ........................................ 2000-015181

(51) Int. Cl.[7] .................................................. B62D 5/04
(52) U.S. Cl. ........................................ 180/446; 361/161
(58) Field of Search .................................... 180/446, 443, 180/444; 361/211, 161; 701/41

(56) References Cited

U.S. PATENT DOCUMENTS

| 5,089,735 | A | * | 2/1992 | Sawaguchi et al. | 310/88 |
| 5,099,409 | A | * | 3/1992 | Bando et al. | 363/54 |
| 5,383,083 | A | * | 1/1995 | Shinoda et al. | 361/103 |
| 5,651,260 | A | * | 7/1997 | Goto et al. | 62/126 |
| 5,839,537 | A | * | 11/1998 | Nishino et al. | 180/443 |
| 5,995,350 | A | * | 11/1999 | Kopelman | 361/103 |
| 6,094,021 | A | * | 7/2000 | Noro et al. | 318/138 |
| 6,194,792 | B1 | * | 2/2001 | Yanou et al. | 307/10.1 |

FOREIGN PATENT DOCUMENTS

JP          5-20999       *   1/1993

* cited by examiner

Primary Examiner—Avraham Lerner
(74) Attorney, Agent, or Firm—Foley & Lardner (57) ABSTRACT

Current correction control is carried out by control process of a control circuit 13 that temperatures of the electromagnetic relays 18a and 18b are assessed one by one based on the detection temperature by the temperature sensor 18c, when the temperature assessed value rises over the predetermined value, the upper limit of the target current value of the motor 11 is decreased.

7 Claims, 4 Drawing Sheets

CURRENT-CARRYING CONTROL DEVICE AND ELECTRIC POWER STEERING APPARATUS

BACKGROUND OF THE INVENTION

1. Field of the Invention

The present invention relates to a current-carrying control device which controls a switching condition (conductible condition or cutoff condition) of a current-carrying line by a relay such as electromagnetic relay or semiconductor relay, or to an electric power steering apparatus including such the current-carrying control device. More particularly, the present invention relates to a device capable of preventing an overheat of the relay practically.

2. Description of the Related Art

In the electric power steering apparatus used for a small vehicle such as light car, a steering torque generated at a steering shaft by steering a handle of the vehicle is sensed by a torque sensor. Corresponding on the steering torque, a steering-assistance torque is generated by flowing a current to an auxiliary motor (hereafter simply called motor) attached at the steering shaft from a battery of the vehicle. In current control of the motor for the torque generation, an H-bridge circuit including usually four FETs (Field Effect Transistor) is used, the motor is driven by a control portion including a microcomputer with PWM (Pulse Width Modulation) system through a driving circuit including the H-bridge circuit.

In the current-carrying line of the driving circuit (if circumstances require, current-carrying line between the driving circuit and a power source, and current-carrying line between the driving circuit and the motor), a relay such as electromagnetic relay is provided as similarly as a general motor control device so as to control the switching condition of the current-carrying line by the control portion. That is, in the case of the electronic power steering apparatus, at a non-operation condition of the apparatus, the current-carrying line is made the cutoff condition by keeping the relay an open state so as to avoid generation of a large current (over-current) by a reverse connection of the battery (to connect the battery of the vehicle with a reverse polarity). In case of a short fault in the FET at an operation of the apparatus, the relay is switched to the open state so as to cut the current-carrying line in order to avoid generation of the large current, malfunction of the motor, or regenerative lock caused by the fault.

The regenerative lock means here phenomena that both terminals of a motor coil are connected by the short fault of the FET, and the handle of the vehicle connected to the motor becomes hard or impossible in rotary operation because so called regenerative break at the motor is generated. In order to solve the problem of such regenerative lock, a relay such as electromagnetic relay is necessary to provide even at the current-carrying line between the driving circuit (exactly, the H-bridge circuit) and the motor.

In such electric power steering apparatus, although measures have carried out to protect the FET from heating by controlling the carrying current to the FET (that is, carrying current to the motor.) so that a temperature of the FET is not more than a designated temperature in related art, measures have not carried out to positively protect the relay from heating. This is because of the following. In related art, such electric power steering apparatus has used only for a small vehicle such as light car as above-mentioned because it is difficult to generate a large steering-assistance torque comparing with a hydrolic device. The current flowing through the motor is low level, maximum about 40 A, at a full operating condition of the apparatus such as operation of the quick turn of the wheel. Because of that, a calorific value of the relay or parts generating heat arranged at periphery thereof (the above FET, for example) is not so large, and the overheat of the relay is prevented practically without problem by means of measures that a suitable radiator is provided.

However the above electric power steering apparatus is easy in electric control. There are various merits that a hydraulic pump and an oil piping are not need and the structure is simple. Accordingly, an application for a normal passenger car is investigated nowadays, and it is possible to apply for a large vehicle in future.

When the apparatus is mounted in such comparatively large vehicle, the current of the motor is needed maximum 60 to 80 A for example in order to drive the motor and then generate the designated steering-assistance torque in the full operating condition of the apparatus such as quick return of the wheel. At such condition, the calorific value (in proportion to a square of the current) from the relay itself or parts generating heat at periphery thereof increases substantially, and it is impossible to protect the relay from the overheat with only the operation of the radiator.

A design so that the relay does not become an overheat state under the condition of the above-mentioned current-increase is possible in principle by providing a radiator corresponding to a maximum calorific value at the control unit of the apparatus where the driving circuit, the microcomputer, and the relay are stored or by selecting a capacity of the relay itself for the maximum current. However practically it is impossible. In this case, the radiator becomes large extremely, and the relay becomes large particularly. Because of that, the ontrol unit is not stored at the narrow limit of space for arranging the unit of this kind in the vehicle.

When the relay becomes the overheat condition for example, there is the possibility that the relay coil thereof deteriorates (decrease of life), burns, or a solder connecting the terminal thereof melts. Such overheat condition must be avoided positively and certainly at a viewpoint to make sure of a high reliability of the steering system in the vehicle.

SUMMARY OF THE INVENTION

Accordingly, an object of the invention is to provide a current-carrying control device which controls a switching condition of a current-carrying line by a relay such as an electromagnetic relay or a semiconductor relay and an electric power steering apparatus including such current-carrying control device, more particularly, a device for avoiding an overheat of the relay positively and certainly with a small construction.

A current-carrying control device according to the invention has a relay provided at a current-carrying line of a load and controlling the current-carrying line to a conductible condition or cutoff condition by a switching operation of the relay. The current-carrying control device also has a temperature sensor detecting a temperature at a designated portion where a temperature of the relay can be detected or calculated, and a current control unit carrying out a current correction control for correcting down a current flowing through there lay according to necessity based on a detection temperature detected by the temperature sensor in order to keep the temperature of the relay less than an allowable temperature.

Here in "load", various kinds of electric loads are included such as a motor, a solenoid, and a lamp. "Current-carrying line of load" means a series of current path (comprising circuit conductor or cable) between the load and a power source (positive pole and negative pole). In case of that there is a driving circuit as a load, a current path between the driving circuit and the power source and a current path between the driving circuit and the load are included.

In "relay", a usual electromagnetic rely, a semiconductor relay, and a switching element such as FET are included. "Temperature of relay" is a temperature of place where it is judged whether by the overheat, a function or a reliability of the relay deteriorates, or is lost or not (that is, whether less than the allowable temperature or not). According to circumstances, is an average temperature of all of relays, or a temperature of a specific place having heat problem of the relay (for example, temperature of the contact of the electromagnetic relay, terminal, or coil).

In "designated portion where the temperature of the relay can be detected or calculated", any portion of the relay itself is included, and a portion being roughly same temperature as temperature of the relay (for example, circuit conductivity connecting terminal of the relay or near part of the terminal at the board) is also included. Further a portion where temperature is changed while a relation with the temperature of the relay is kept (for example, a part comparatively near to the relay at a radiation plate for radiating the heat of the rely) is included. As an extreme mode, a portion equal to circumstance temperature of the apparatus is also included.

"Designated portion" is sure of a portion where the temperature of the relay including a certain allowable error can be detected or calculated. Incidentally in a relay such as an electromagnetic rely usually used for an electric power steering apparatus, as the allowable temperature of a terminal (solder connection part) and coil is a level of, for example, 120° C. to 200° C., at least error of 1° C. to 10° C. is practically permitted.

"Current correction control" maybe, for example, a control for decreasing the current than usual based on the detection temperature of the temperature sensor (for example, control for surely decreasing the current value only a ratio according to the detection temperature). Further the control may be a current limitation control for limiting the current than usual based on the detection temperature of the temperature sensor (for example, control for decreasing an upper limit value of the current only a ratio according to the detection temperature, the current does not always decrease every time).

According to the invention, as the temperature sensor detects the temperature of the designated portion such as the above-mentioned, the temperature of the relay can be judged and monitored based on detection temperature of the temperature sensor. Based on the result of monitoring, the current correction control is carried out for correcting down the current flowing through the relay according to necessity, and the temperature of the relay is kept less than the allowable temperature.

Accordingly, it is positively and surely avoided that the relay deteriorates or is damaged by the overheat. Furthermore as the current being the source of the heat is limited, the relay is protected surely from the overheat without providing a large radiator or an enlarging capacity (size) of the relay. Therefore, the device can make sure of high reliability avoiding enlarging the device.

An electric power steering apparatus according to the invention has an auxiliary motor which is connected to a steering system of a vehicle and generates a steering-assistance torque, a bridge circuit which comprises plural switching elements and drives the auxiliary motor, and a relay which is provided at a current-carrying line of the auxiliary motor. The apparatus cuts the current-carrying line by making the relay an open state when an abnormal condition to cut the current-carrying line occurs. At a usual operation condition not generating the abnormal condition, the apparatus controls the current of the auxiliary motor to a target current value so that the steering-assistance torque becomes a value corresponding to the steering torque, by operating the switching elements according to the steering torque of the steering system while the current-carrying line with an conductible condition is kept by making the relay a close state. The apparatus has a temperature sensor for detecting a temperature at a designated portion where a temperature of the relay can be detected or calculated, and a current control means for carrying out a current correction control for correcting down the target current value according to necessity based on the detection temperature detected by the temperature sensor in order to keep the temperature of the relay less than an allowable temperature.

Here in "current-carrying line of the auxiliary motor", a current-carrying line (current path) between the bridge circuit and the power source and a current-carrying line (current path) between the bridge circuit and the auxiliary motor are included.

According to the invention, as the temperature sensor detects the temperature of the designated portion such as the above-mentioned, the temperature of the relay is judged and monitored based on the detection temperature of the temperature sensor. Based on the result of monitoring, the current correction control is carried out for correcting down the target current value of the auxiliary motor according to necessity. Accordingly, the temperature of the relay is kept less than the allowable temperature.

Because of that, although the steering-assistance torque is decreased as rate as the limitation and the steering operation becomes heavy as rate as the torque, it is positively and surely avoided that each relay deteriorates or is damaged by the overheat. Further as the current being the source of the heat is limited, each relay is protected surely from the overheat with out providing a large radiator and making the capacity (size) of the relay large. Accordingly, the apparatus can keep the high reliability avoiding enlarging the control unit of the electric power steering apparatus. Result of this, the high reliability electric power steering apparatus protected surely from the overheat of the relay can be realized even for the comparatively large vehicle such as a normal personal car in which the large current is necessary to flow for driving the auxiliary motor. Further the apparatus has practically a superior effect corresponding to needs of market that the unit is constructed with a suitable size for mounting the control unit of the apparatus onto the vehicle.

A preferred construction of the invention is that the temperature sensor measures a temperature of a specific part of the relay as the temperature of the designated portion.

According to the construction, the temperature of the specific part of the relay is measured directly, and the temperature is monitored correctly and easily to protect the overheat of the relay.

A preferred construction of the invention is that the temperature sensor measures a temperature of a board mounting the relay thereon as the temperature of the designated portion.

According to the construction, as the temperature sensor is provided by mounting on the above-mentioned board, an attachment of the temperature sensor becomes easy.

A preferred construction of the invention is that the board (board mounting a relay) is a board made by metal.

According to the construction, the heat generated at the relay radiates efficiently outside through the board. By that the overheat of the relay is hard to generate, and the operation frequency and degree of the above-mentioned current correction control becomes a little so as to obtain an effect easing the harmful effect of the current correction control (harmful effect that the steering operation becomes heavy as degree as correcting down the target current value). In this case, as the temperature of the board measured by the temperature sensor becomes more desirable on the point of judging the temperature of the relay (that is, a relation between temperature of the relay and temperature of the board become more accruable), and it becomes possible to judge and monitor accurately the temperature of the relay so as to show effectively and efficiently action and the effect of the current correction control.

Particularly when the relay is surface-mounted on the board, the heat generated at the rely efficiently transfers to the board, and the heat generated at the rely efficiently radiates outside through the board so that the above-mentioned action and effect become more clear.

A preferred construction of the invention is that the current control unit carries out the current correction control when the detection temperature detected by the temperature sensor rises over a predetermined value.

According to the construction, the judging process is simplified whether the current correction control is carried out or not.

A preferred construction of the invention is that the current correction control raises a degree for correcting down the target current value step by step or continuously according to increase of the detection temperature or below-mentioned temperature assessed value.

According to the construction, for example, when a degree of a high temperature state of the relay is comparatively low level as not so urgent, a flexible control is possible that a degree for limiting the current is controlled to be small and as a large steering-assistance torque as possible is kept. Especially in the case of increasing the correction level continuously, a fine current correction according to the degree of the high temperature state becomes possible, and it becomes finely possible that the overheat of the relay is surely avoided with as necessary minimum current correction as possible and on the other hand as large steering-assistance torque as possible is generated.

A preferred construction of the invention is that a temperature rise caused by Joule heat at the relay from the current flowing through the relay is calculated, the detection temperature detected by the temperature sensor is added to the temperature rise, a temperature assessed value of the relay is calculated, and when the temperature assessed value rises over a predetermined value, the current control means carries out the current correction control.

According to the construction, the temperature detected by the temperature sensor is a base temperature at assessment of temperature of the relay. Even if the temperature sensor does not measure the temperature of the relay itself and the temperature of a part correlating therewith (for example, even if the temperature is detected at a place separating some degree from the relay on the board), the temperature assessed value of the relay is calculated correctly enough (in allowable error) so as to show action and effect of the current correction control with fully actual level. Therefore a degree of freedom of the arrangement of the temperature sensor increases, and it becomes easily possible to use the temperature sensor for another object (for example, the temperature monitoring of the switching element constructing the bridge circuit).

DETAILED DESCRIPTION OF THE PREFERRED EMBODIMENTS

A mode for carrying out the invention is described below referring the figure. A embodiment of hardware construction of an electric power steering apparatus is described using FIG. 1. The apparatus has an auxiliary motor 11, a control circuit 13, a power circuit 15, and a torque sensor 16. The auxiliary motor 11 is connected to a steering system of a vehicle and generates a steering-assistance torque (hereafter, simply called motor 11). The control circuit 13 controls the motor 11 through a driving circuit 12 (including an H-bridge circuit 12a). The power circuit 15 supplies a designated electric power to the control circuit 13 based on the output of a power source 14 (a battery) of the vehicle. The torque sensor 16 detects a steering torque of the steering system. Here the control circuit 13 is suitable for a current control unit of the invention.

Figure 1:
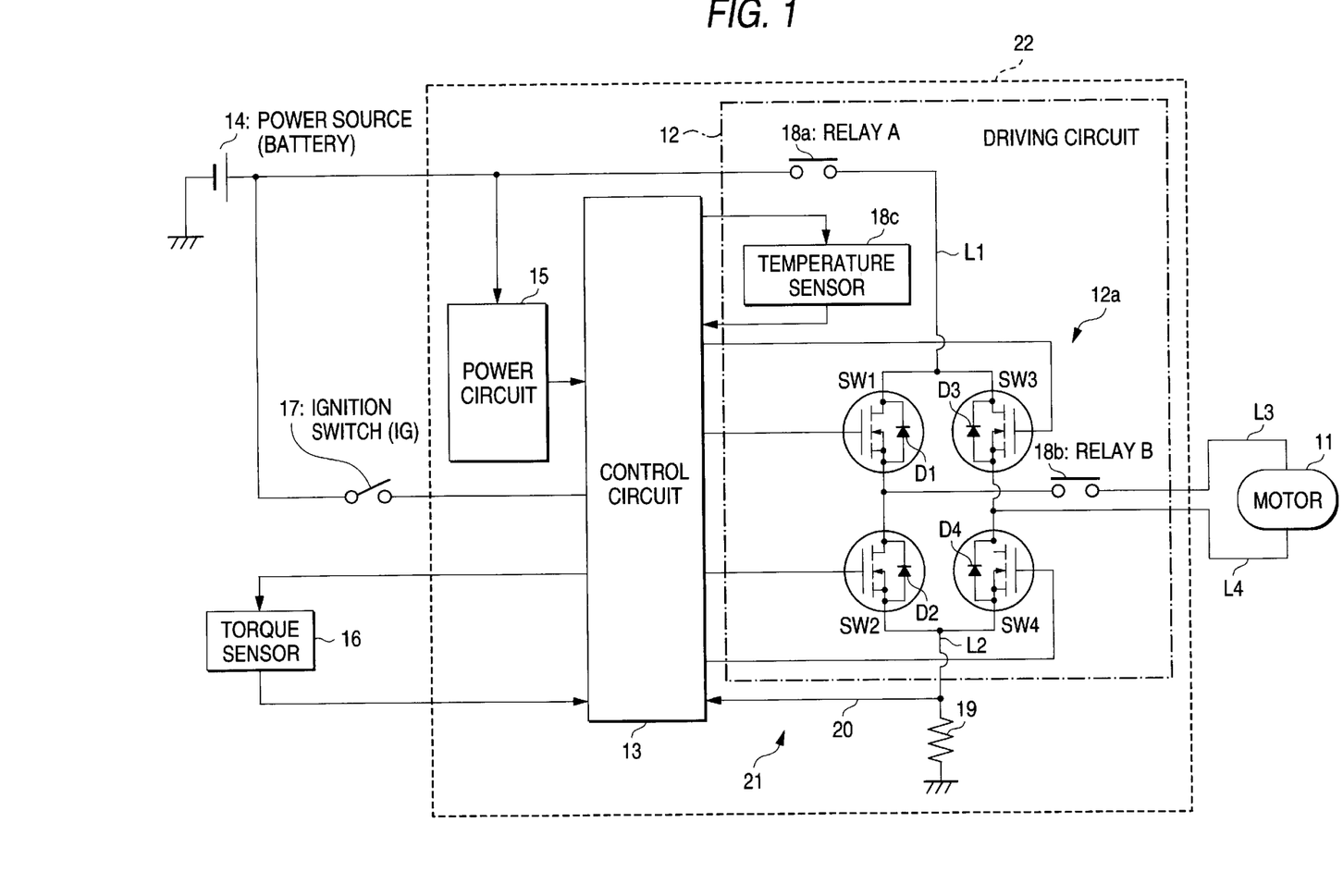
FIG. 1 is a view showing entire construction of an electric power steering apparatus.

In FIG. 1, symbol 17 is an ignition switch which functions as a starting switch of the control circuit 13 in the device.

Symbols 18a and 18b are electromagnetic relays (positively, contact points of the electromagnetic relays), and coils of these electromagnetic relays are driven and controlled by the control circuit 13 through a circuit not shown.

Symbol 18c is a temperature sensor (thermistor for example) for measuring a temperature of below-mentioned driving circuit board 41 (in this case positively, temperature of a circuit conductor 42 on the board 41) and provided on the driving circuit board 41 where the driving circuit 12 is formed. An output of the temperature sensor 18c is input to the control circuit 13.

Symbol 19 is a resister (shunt resister) connected to a grand side of the bridge circuit 12a (that is, current-carrying line L2 between the bridge circuit 12a and a negative pole of the power source 14), and a voltage suitable for a voltage fall of the resister 19 is input to the control circuit 13 through input line 20. As the voltage value input from the input line 20 is naturally in proportion to a current value of the motor 11 (hereafter simply called motor current value), it is possible to detect the motor current value. The resister 19 and the input line 20 substantially construct a current detecting means 21 of motor current. The driving circuit 12, the control circuit 13, the power circuit 15, and so on construct a control unit 22 of the power steering apparatus.

Here the driving circuit 12 includes the H-bridge circuit 12a in which, in this case, four field effect transistors SW1 to SW4 (hereafter called FETSW1 to FETSW4) are connected in H-bridged type to the motor 11. Each of FETSW1 to FETSW4 as a switching element constructing the H-bridge circuit 12a is operated by PWM driving signal output from the control circuit 13. In this case, each of FETSW1 to FETSW4 is an N-channel enhancement type MOSFET where diodes D1 to D4 (parasitic diodes) are disposed between drain and source structurally.

The electromagnetic relay 18a (relay A) is provide at a current-carrying line L1 between the bridge circuit 12a and a positive pole of the power source 14. The electromagnetic relay 18a makes the current-carrying line L1 a conductible condition with a close state at a driving condition (coil exiting condition), and makes the current-carrying line L1 a cutoff condition with an open state at a non-driving condition (coil non-exiting condition). The electromagnetic relay 18b (relay B) is provide at another current-carrying line L3 between the bridge circuit 12a and the motor 11. The electromagnetic relay 18b makes the current-carrying line L3 a conductible condition with a close state at the driving condition, and makes the current-carrying line L3 a cutoff condition with an open state at the non-driving condition.

The control circuit 13 comprises a circuit including a microcomputer, and has control function at a usual condition (normal operation condition not abnormal condition as mentioned below) in which the H-bridge circuit 12a is controlled by generating PWM driving signal with a duty ratio for realizing a motor current corresponding to the steering torque in order to generate the auxiliary steering torque according to the steering torque value sensed form a detection signal of the torque sensor 16. The control circuit 13 also corrects the motor current down (suppression or limitation) than the usual condition by judging various kinds of abnormal condition (described below) based on the detection value of the temperature sensor 18c and the current detecting means 21. Further, the control circuit has fail safe function for avoiding the over-current or the regenerative lock by making the electromagnetic relay 18a or 18b (relay A or B) the open state (details are described below).

The power circuit 15 converts the voltage of the battery 14 (normally 12V to 14V) to the designated voltage (5V for example) and supplies the designated voltage to the control circuit 13.

The electromagnetic relay 18a may be provided at the current-carrying line L2 between the bridge circuit 12a and the negative pole of the power source 14 (that is, ground). The electromagnetic relay 18b may be provided at the current-carrying line L4 between the bridge circuit 12a and the motor 11. The relay such as the electromagnetic relay 18a is always provided. The relay such as the electromagnetic relay 18b is not always needed, and is not needed in the case that the regenerative lock does not become problem (for example, in the case that the turn operation of the handle of the vehicle is somehow possible even at such a condition that both ends of coil of the motor 11 are connected, or in the case that connection of the motor 11 and the steering system is properly released by providing a clutch between the motor 11 and the steering system).

An electrolytic capacitor which performs back-up of the power source at increase current of the motor 11 (hereafter simply called motor current), and a ceramic capacitor for radio wave measures which suppresses a noise radiation are provided at a unit 22 besides the above-mentioned elements though not shown in the figure.

Figure 2A:
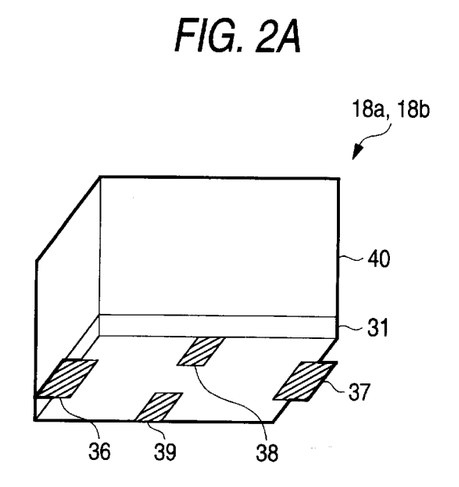
FIGS. 2A–C are respectively views showing an inside construction of an electromagnetic relay and periphery construction.
Figure 2B:
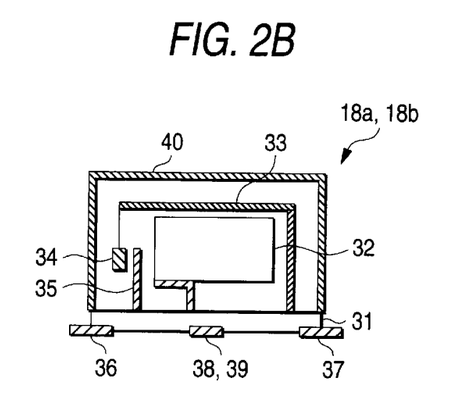
Figure 2C:
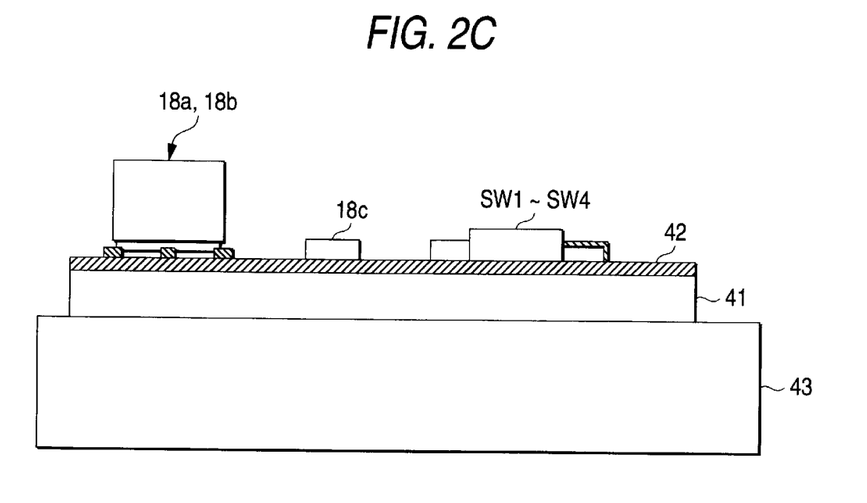

Next, structure of the electromagnetic relays 18a and 18b and construction of periphery thereof is described referring FIGS. 2A–C.

FIG. 2A is a perspective view showing the exterior of each relay. FIG. 2B is a side section view showing inside structure of each relay. FIG. 2C is a side view of a driving circuit board where each relay is mounted.

As shown in FIGS. 2A and 2B, each relay has a baseboard 31, an electromagnet 32, a moving contact spring 33, a moving contact 34, a fixed contact 35 and a common terminal 36. The baseboard 33 supports and fixes each parts directly or indirectly. The electromagnet 32 includes a coil and a core. The moving contact spring 33 displaces elastically by an attraction of the electromagnet 32. The moving contact 34 provides at a tip of the moving contact spring 33. The fixed contact 35 is arranged facing to the moving contact 34. The common terminal 36 is connected to the fixed contact 35 and a connecting terminal thereof is exposed at lower face, left end of the baseboard 31. Further the relay has an a contact terminal 37, coil terminals 38 and 39 and a box type case 40. The a contact terminal 37 is connected to the moving contact 34 through the moving contact spring 33 and the a connecting terminal thereof is exposed at lower face, right end of the baseboard 31. The coil terminals 38 and 39 are connected to each coil terminal of the electromagnet 32 and connecting terminals thereof are exposed at both side of lower face, center portion of the baseboard 31. The box type case 40 is made of synthetic resin attached at upper face side of the baseboard 31 so as to cover each parts (except connecting terminal of each terminal).

The relay is an electromagnetic relay that the moving contact 34 displaces to the fixed contact 35 by the attraction of the electromagnet 32 and a restoring force of the moving contact spring 33, and a contact condition between the moving contact 34 and the fixed contact 35 is switched. That is, at the driving condition that power source is supplied between the coil terminals 38 and 39 by control of the control circuit 13 and the electromagnet 32 functions, the moving contact 34 displaces to a direction contacting to the fixed contact 35 by the attraction of the electromagnet 32, and the common terminal 36 and the a terminal 37 are made a conductible condition At the non-driving condition that power source is not supplied between the coil terminals 38 and 39, the moving contact 34 displaces to a direction separating from the fixed contact 35 by the restoring force of the moving contact spring 33, and the common terminal 36 and the a terminal 37 are made a non-conductible condition. Although each electromagnetic relays 18a and 18b is described as the same structure, they may be different structure and the capacity (size) of them may be different.

In this case, each relay is mounted on a driving circuit board 41 as shown in FIG. 2C.

The driving circuit board 41 is a metal board, and the driving circuit 12 is formed thereon. That is, the driving circuit board 41 is made in such a manner that a non-conductive layer (not shown) is formed on a surface (mounting face side) of an aluminum plate being base material, a wiring pattern 42 as a circuit conductor is formed on the layer by printed wiring technique, and parts such as FETSW1 to FETSW4 and electromagnetic relays 18a and 18b constructing the driving circuit 12 are mounted at designated portion of the wiring pattern 42. In this case, the FETSW1 to FETSW4 and electromagnetic relays 18a and 18b are arranged forming a line to a direction crossing the paper of FIG. 2C at right angles, and the chip of the temperature sensor 18c is mounted at position between these FETSW1 to FETSW4 and electromagnetic relays 18a and 18b.

In FIG. 2C, an upper face side is a mounting face of the metal board (driving circuit board 41). At least each terminal 36 to 39 of electromagnetic relays 18a and 18b are made in shape of a surface for mounting (shape of lateral direction, parallel to mounting face), and are surface-mounted at a designated portion of the wiring pattern 42 on the driving circuit board 41. For example, after previously painting cream solder on an upper face of the designated portion of the wiring pattern 42, soldering is carried out by connecting an outer face (lower face) of each terminal 36 to 39 to the upper face of the designated portion, radiating infrared ray at the connecting portion, and melting the cream solder temporarily.

In this case, the temperature sensor 18c measures the temperature of the driving circuit board 41 (positively, wiring pattern 42).

In the mode for carrying out, a radiating board 43 made by, for example, die-cast of aluminum is provided at a back face (lower face side) of the driving circuit board 41 while they are connected each other. The radiating board 43 is provided so as to expose at outer face (lower face) of the control unit 22.

In such the construction, the heat generated at the electromagnetic relays 18a and 18b and EFTSW1 to FETSW4 is efficiently transferred to a lower direction in the figure through the driving circuit board 41, and finally radiated efficiently to outside of the unit (air outside) from the radiating board 43. Particularly, in the electromagnetic relays 18a and 18b, Joule heat generated mainly at each contact 34 and 35 efficiently transfers first to each member made of metal (common terminal 36, moving contact spring 33, a contact terminal 37) because of the structure. Next, the heat transferred to the common terminal 36 and a contact terminal 37 efficiently transfers the wiring pattern 42 of the driving circuit board 41 because of surface mounting structure. Then heat transferred to the wiring pattern 42 is efficiently transferred and radiated to the radiating board 43 side.

Further, in such the above-mentioned construction, the temperature measured by the temperature sensor 18c (temperature of the wiring pattern 42 of the driving circuit board 41) excellently changes as the base temperature of the electromagnetic relays 18a and 18b and FETSW1 to FETSW4. That is, a part measured by the temperature sensor 18c (the wiring pattern 42 of the driving circuit board 41) becomes the designated portion of the invention capable of being excellent base temperature at estimating temperature of the electromagnetic relays 18a and 18b (relays). In this case, the detection temperature of the temperature sensor 18c is also capable of being an excellent base temperature when the temperature of FETSW1 to FETSW4 is estimated. That is, the temperature sensor 18c in this case in not only a sensor for the detecting temperature of the electromagnetic relays 18a and 18b but is used for a sensor for the detecting temperature of FETSW1 to FETSW4, the reduction of the number of parts is realized comparing with the construction providing another temperature sensor.

Although entire construction of the control unit 22 is not shown in FIG. 2C, the following structure, for example, is summarized.

That is, the control unit 22 comprises a baseboard (not shown), the driving circuit board 41, a frame-shaped plastic case (not shown), a non-conductive board (not shown), the radiating plate 43 and a cover member (not shown). The baseboard has the electrolytic capacitor and shut resistor mounted thereon and a large current circuit (a part of the current-carrying lines L1 to L4) formed thereon. The driving circuit board 41 is attached by adhesive at a lower face of the baseboard. The frame-shaped plastic case (not shown) constructs an outer wall of a side face of the unit and has a connector for external wiring (not shown) provided thereon. The non-conductive board has a low voltage circuit such as the control circuit 13 formed thereon and attached on an upper face of the baseboard. The radiating plate 43 is attached at a lower face side (lower face side of the unit) of the plastic case while it is connected with a lower face of the driving circuit board 41 as above-mentioned. The cover member (not shown) is attached on an upper face of the plastic case so as to cover an upper face side of the unit.

An outline of assembly process is the following. That is, first the driving circuit board 41 forming the driving circuit 12 is attached on the baseboard and connected by wire bonding. Next, thus assembled intermediate assembling part is assembled to the plastic case to which the radiating plate 43 is previously attached. After that, the non-conductive board having the control circuit 13 formed thereon is attached to the baseboard so as to be disposed on the upper position of the driving circuit board 41 for example, and then the cover member is attached at the upper face side of the unit, so that the assembly process is completed.

Next, an embodiment (first embodiment) of control content of the control circuit 13 is described.

The control circuit 13 starts when an ignition switch 17 as a start switch is made ON, and repeatedly carries out a series of operation including the following processes at a certain period, for example, till a usual operating condition of the control circuit 13 stops by making the ignition switch 17 OFF.

First, a process is performed for calculating the target current value of the motor current according to the value of the steering torque detected from the detection signal of the torque sensor 16. Although this calculation calculates the motor current value for generating the target steering-assistance torque according (for example, in proportion) to the steering torque as a target current value, the target current value (that is, target steering-assistance torque) may be calculated by considering parameters except the steering torque. For example, the construction is possible in which the steering-assistance torque varies a little according to a speed of the vehicle by varying the target current value based on the speed of the vehicle even if the steering torque is same. Nowadays as means for detecting the speed is usually provided at any kinds of vehicle, it is possible to carry out the above calculation by that the control circuit 13 detects the speed if a signal of speed detecting means is input even to the control circuit 13.

After a process for carrying out the current correction control to protect the electromagnetic relays 18a and 18b from overheat, the control circuit 13 controls each FET of the H-bridge circuit 12a by generating PWM driving signal of a duty ratio for realizing the target current value obtained at before processes. Because of this, the current almost equivalent to the target current value flows to the designated direction of the motor. In the condition that the current correction control does not function (in this case, a low temperature condition that the overheat of the electromagnetic relays 18a and 18b is impossible), for example, the auxiliary steering torque of the same direction as the steering torque with the magnitude according to the steering torque is generated so as to fully assist the steering operation.

Although the control circuit 13 naturally controls each electromagnetic relay 18a and 18b to the close state in the usual operation condition, the control circuit 13 performs a process always monitoring an occurrence of abnormality such as the following. The control circuit 13 has fail safe function for cutting the current-carrying line L1 by making at least the electromagnetic relay 18*a* (relay A) the open state when the abnormality is detected.

For example, in the case that actual motor current value detected by the current detecting means 21 increases extremely than the target current value and then become impossible to control, and it is assumed that any of FETs shorts, the current-carrying line L1 is instantly cut by making the electromagnetic relay 18*a* (relay A) the open state so as to avoid the malfunction or the damage of the motor 11. In this case, at the same time, the current-carrying line L3 is cut by making the electromagnetic relay 18*b* (relay B) the open state so as to avoid the regenerative lock of the motor 11.

For example, in the case that temperature detected by the temperature sensor 18*c* extremely rises and it is judged that it is impossible to cancel the overheat condition by below-mentioned current correction control, the current-carrying line L1 is instantly cut by making the electromagnetic relay 18*a* (relay A) the open state, and the current of each current-carrying line L1 to L4 is made zero so as to protect surely the damage of each relay and FET by the overheat.

Figure 3:
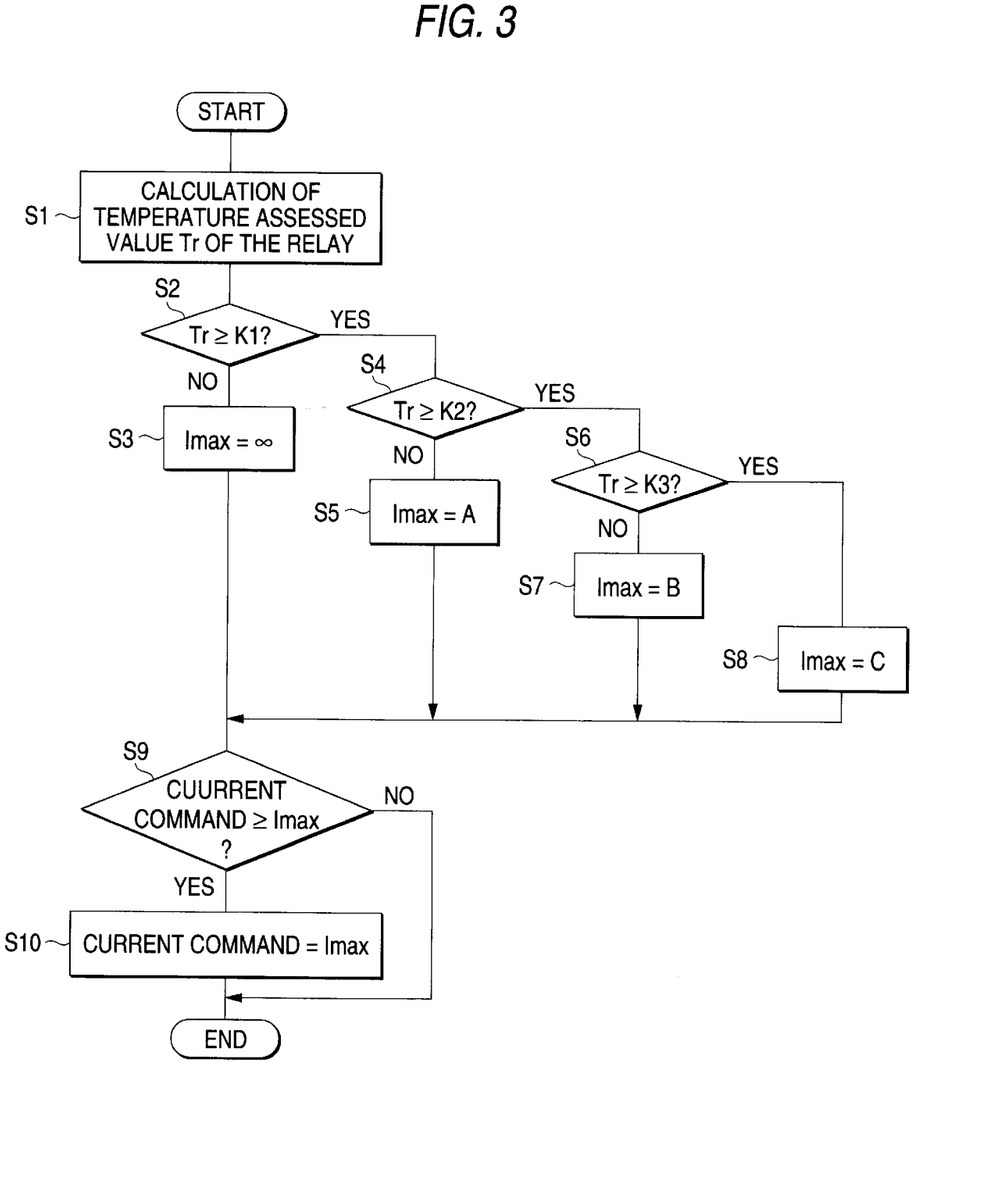
FIG. 3 is a flowchart showing an embodiment of process content of a control circuit.

The control circuit 13 carries out at least a series of processes shown in FIG. 3 as the current correction process according to the invention. In this case, these processes are carried out repeatedly cyclically as long as the control circuit operates as a subroutine opposing to main routine in operation program of the control circuit 13 for example.

When the subroutine is started, first in Step 1, a temperature assessed value T of the electromagnetic relays 18*a* and 18*b* (in this case strictly, assessed value of the temperature of the contact of each relay) is calculated from the detection temperature Ts detected by the temperature sensor 18*c*. Concretely, by calculating square of a current vale I of each current-carrying line L1 or L3 (that is, current value flowing through each relay) detected by the current detecting means 21 and multiplying a contact resistance value R (previously set-up value by experiment or calculation) of each relay, a calorific value $RI^2$ of Joule heat generated at contact of each relay is calculated one by one. By carrying out one by one integral calculation taking physical property value of the contact of each relay as a parameter (previously set-up value by experiment or calculation) to the newest data row of calorific value $RI^2$ obtained like the above, a temperature rise value $\Delta Tr$ caused by the calorific value is calculated. Then by adding the temperature rise value $\Delta Tr$ obtained like the above to the detection temperature Ts detected at that time, the temperature assessed value Tr (=Ts+$\Delta Tr$) of each relay at time point is calculated.

Method of calculation of the temperature assessed value Tr is not limited by the above-mentioned mode, and various suitable modes are used according to a position for attaching the temperature sensor 18*c* (temperature measuring portion) or structure of the relay.

For example, the temperature of the specific part of each relay (for example, the common terminal 36 and the a contact terminal 37) or the temperature of a part where a temperature is changed in such a condition that the relation with the temperature of each relay is kept (for example, nearby position of each relay on the driving circuit board 41) is measured, and then the measured value itself or a value is obtained by multiplying a designated coefficient to the measured value may be the temperature assessed value.

In this case, as the value of the current I flowing through the relay is different in the electromagnetic relay 18*a* and the electromagnetic relay 18*b* and the temperature condition is different in the electromagnetic relay 18*a* and the electromagnetic relay 18*b*, it needs desirably to calculate the temperature assessed value of every relay. In judge of the following steps S2, S4, S6, for example, it is desirable to process using the temperature assessed value of the relay of side where the high temperature condition is high (near allowable temperature).

Next, in step S2, it is judged whether the temperature assessed value Tr of the relay calculated at step S1 is more than a predetermined value K1 or not. When the temperature assessed value Tr is more than the predetermined value K1, it is judged that the temperature is in high temperature condition where the current correction is to be needed (in this case, current limitation) and then the process advances to step S4. When it is not so, it is judged that current limitation is not need and then the process advances to step S3.

In step S3, a value of the current limitation value Imax is set up to infinity ($\infty$).

On the other hand, in step S4, it is judged whether the temperature assessed value Tr of the relay calculated at step S1 is more than a predetermined value K2 or not. When the temperature is more than the predetermined value K2, it is judged that the temperature is in the high temperature condition where a comparably severe current limitation is to be needed and then the process advances to step S6. When it is not so, it is judged comparably loose current limitation is to be performed and then the process advances to step S5.

In step S5, the value of current limitation value Imax is set up to the largest set-up value A.

In step S6, it is judged whether the temperature assessed value Tr of the relay calculated at step S5 is more than a predetermined value K3 or not. When the temperature is more than the predetermined value K3, it is judged that the temperature is in high temperature condition near an allowable temperature where the severest current limitation is to be needed and then the process advances to step S8. When it is not so, it is judged an intermediate degree current limitation is to be performed and then the process advances to step S7.

In step S7, the value of current limitation value Imax is set up to an intermediate degree set-up value B. On the other hand, in step S8, the value of current limitation value Imax is set up to the smallest set-up value C.

Each the predetermined value K1 to K3 may be set up to adaptable value considering allowable temperature of each relay and factor of safety (margin) thereto.

In this case, it is necessary to set up so that relation of K3>K2>K1 is established. Concretely, it may be set up such that K3 is 90% of the above-mentioned allowable temperature, K2 is 80% of the allowable temperature, and K1 is 70% of the allowable temperature.

Each set-up value A to C selected as the value of current limitation value Imax may be set up so that adaptable current limitation according to each predetermined value K1 to K3. For example, set-up value A is 90% of the maximum of the target current value, set-up value B is 50% of the same, and set-up value C is 10% of the same.

Next, in step S9, it is judged whether a current command (that is, target current value determined according to the steering torque) is more than the value of current limiting value Imax or not. When the current is more than the value of current limiting value Imax, the process advances to step S10. When it is not so, it is judged that current limitation is not need because of less than the current limitation value and then the process ends the process of one sequence.

In step S10, the value of the target current value is corrected down by renewing to the value of the current limiting value Imax. That is, when the target current value is larger than the value of current limiting value Imax, the target current value is changed to the value of the current limiting value Imax and corrected so as to be equal or less than the value of current limiting value Imax (that is, the target current value is limited equal to or less than the value of current limiting value Imax).

In the case that judge of step S2 is negative as above-mentioned, step S3 is carried out so that the value of current limiting value Imax is infinity. Because of that, in this case, the current limitation is not carried out practically. In this case, the target current value does not increase freely. Because a certain limitation value (maximum value) exists naturally and the target current value is impossible to become a value larger than the maximum value. Therefore the current correction control (current limitation control) of the embodiment for carrying out shown in FIG. 3 is to correct down the maximum value of the target current value according to the temperature of the relay.

According to the process of FIG. 3 above-described, when the temperature of each relay rises near the allowable temperature and is more than the predetermined value K1, the target current value is limited than the normal condition and corrected down according to necessity, and even PWM driving signal is corrected according to this limitation. As a result, even the current value of each relay (in this case, current value of the current-carrying lines L1 and L3) is limited similarly. Because of that, although the steering-assistance torque is decreased as rate as the limitation and the steering operation becomes heavy as rate as the torque, it is positively and surely avoided that each relay deteriorates or is damaged by the overheat. Further as the current being the source of the heat is limited, each relay is protected surely from overheat without making the capacity (size) of the radiation plate 43 and each relay, and the process has effect superior practically keeping the high reliability avoiding enlarging the device.

Limitation of the current value is carried out step by step corresponding to the temperature of each relay by plural above-mentioned predetermined values K1 to K3 and current limitation values A to C. Because of that, for example, when a degree of high temperature condition of each relay is comparably low level as it is not so urgent, a flexible control is possible to make sure of the steering-assistance torque as large as possible by decreasing a degree for limiting the current.

The control process similar as the current correction control for the over heat protection of the above-mentioned relay may be carried out about FETSW1 to FETSW4. Then effect is obtained to avoid positively and surely even overheat of FETSW1 to FETSW4. In this case, the temperature assumption of FETSW1 to FETSW4 is possible using the same temperature sensor 18c as the relay.

Next, another embodiment (second embodiment) of control content of the control circuit 13 is described below. As the second embodiment has characteristic at a part of process for current correction control and another processes content is similar as the first embodiment, repeated description of content similar as the first embodiment is omitted putting the same symbol.

Figure 4A:
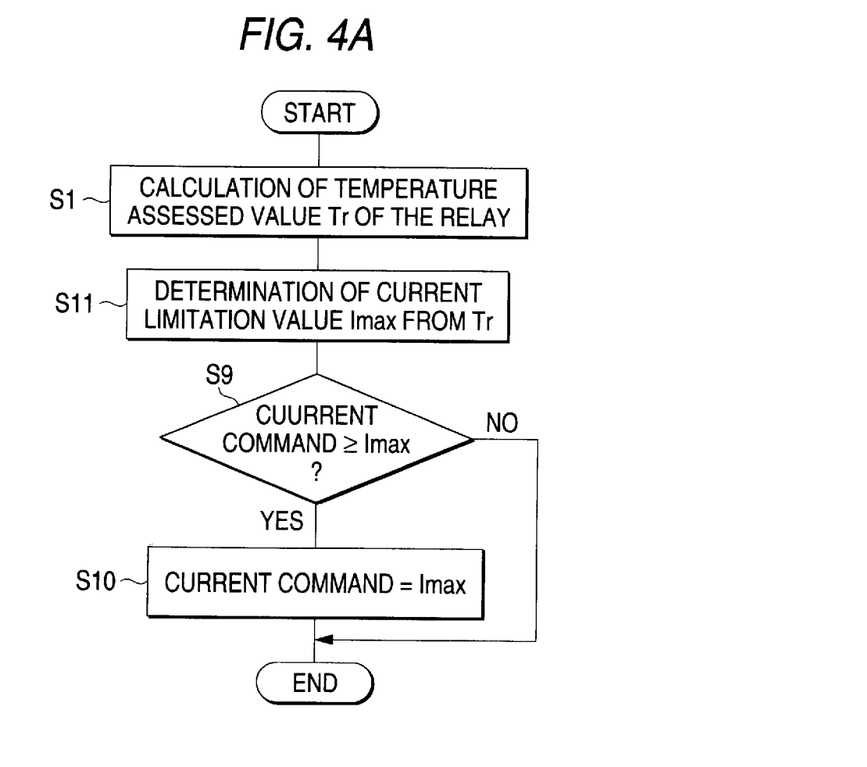
FIGS. 4A–B are respectively flowcharts showing an another embodiment of process content of a control circuit.

The control circuit 13 of the embodiment carries out process shown in flowchart of FIG. 4A as a process of the above-mentioned subroutine for current correction control. Characteristic here is a step S11 provided instead of the above-mentioned steps S2 to S8. In step S11, the current limitation value Imax is determined by estimating the temperature assessed value Tr of the relay continuously based on data table (or function) for determining maximum current previously set up as FIG. 4B.

Figure 4B:
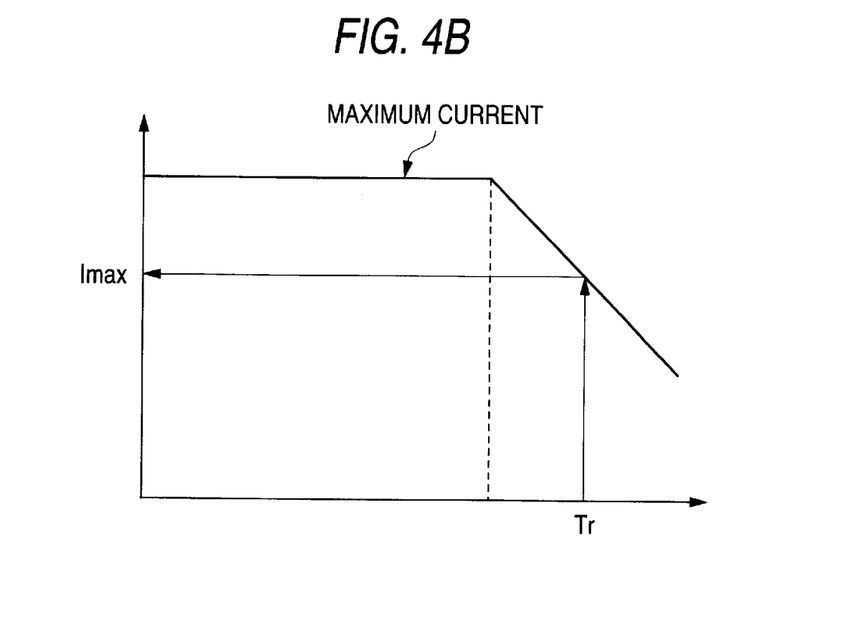

In such process content, the following characteristic is obtained adding effect of the above-mentioned first embodiment. That is, a fine current limitation according to the degree of the high temperature condition of the relay is possible, and it becomes possible finely that the overheat of the relay is surely avoided with a necessary minimum current limitation and the steering-assistance torque is generated as much as possible.

The invention is not limited only to the above-mentioned embodiments and it is clear that there are various kinds of embodiment.

For example, the current correction control of the invention is not limited to the control process for limiting the current (to correct down the maximum value of the current) as above-mentioned. The current correction control may be control that the target current value is decreased by taking a designated ratio according to the high temperature level of the relay, for example, away from the target current value determined according to the steering torque when the temperature (detected value or assessed value) of the relay is more than a predetermined value.

As the above-mentioned embodiment, in the case that there are relays at several places and the overheat of one relay prevent by only natural radiation, the current correction control of the invention may be carried out about only the other relay. In the case that there are relays at several places, respective current correction controls maybe carried out about each relay.

Although the temperature sensor 18c of the above-mentioned embodiment is used even for the temperature monitoring of FET, the temperature sensor only for the relay may be provided. In the case that there are plural relays, the temperature sensors may be provided at every relay.

An idea of the invention is not limited to the above-mentioned electric power steering apparatus, a device having a relay (electromagnetic relay, or switching element such as FET) for switching a current-carrying line and problem of the overheat of the relay (particularly device required miniaturization) is applicable and has similar effect as the above.

The current-carrying control device according to the invention can judge the temperature of the relay based on the detection temperature of the temperature sensor and monitor the relay. Current correction control for correcting down the current through the relay according to necessity based on the result of monitoring is performed so as to keep the temperature of the relay less than the allowable temperature.

Because of that, it can avoid positively and surely that the relay deteriorates or is damaged by the overheat. Furthermore as the current being the source of the heat is limited, the relay is protected surely from the overheat without providing a large radiator or an enlarging capacity (size) of the relay, and the device can make sure of the high reliability avoiding enlarging the device.

Even the electric power steering apparatus of the invention using such current-carrying control device can make similarly sure of high reliability avoiding enlarging the apparatus (in this case, enlarging the control unit). Result of this, the high reliability electric power steering apparatus protected surely from the overheat of the relay can be realized even for comparatively a large vehicle such as normal personal car in which large current is necessary to flow for driving the auxiliary motor. Further the device has practically superior effect corresponding to needs of market that the unit is constructed with suitable size for loading the control unit of the device onto the vehicle.

What is claimed is:

1. An electric power steering apparatus comprising:
   an auxiliary motor connected to a steering system of a vehicle and generating a steering-assistance torque;
   a bridge circuit having a plurality of switching elements and for driving said auxiliary motor;
   a relay provided at a current-carrying line of said auxiliary motor;
   a temperature sensor detecting a temperature at a designated portion where a temperature of said relay can be detected or calculated, wherein said temperature sensor measures a temperature of a board where said relay is mounted as the temperature of said designated portion; and
   a current control unit carrying out a current correction control for correcting a current flowing through said relay based on a detection temperature detected by said temperature sensor.

2. The electric power steering apparatus according to claim 1, wherein said board is a board made of metal.

3. The electric power steering apparatus according to claim 1, wherein said current control unit carries out the current correction control when the detection temperature detected by said temperature sensor rises over a predetermined value.

4. The electric power steering apparatus according to claim 3, wherein said current control unit corrects down the current flowing through said relay step by step or continuously according to an increase of the detection temperature in order to keep the temperature of said relay less than an allowable temperature.

5. The electric power steering apparatus according to claim 1, wherein said current control unit carries out the current correction control when a temperature assessed value rises over a predetermined value, said temperature assessed value being a sum of a temperature rise caused by Joule heat at the relay calculated from the current flowing through said relay and the detection temperature detected by the temperature sensor.

6. The electric power steering apparatus according to claim 1, wherein said current control unit operates said relay in an open state to make the current-carrying line in a cutoff condition when an abnormal condition occurs.

7. The electric power steering apparatus according to claim 1, wherein, at a usual operation condition, said current control unit controls, by operating the switching elements according to a steering torque of the steering system, a current of said auxiliary motor to a target current value for generating the steering-assistance torque according to the steering torque while operating said relay in a closed state to keep the current-carrying line in a conductible condition.

* * * * *